United States Patent
Chen et al.

(10) Patent No.: US 10,282,831 B2
(45) Date of Patent: May 7, 2019

(54) METHOD AND APPARATUS FOR MOTION COMPENSATED NOISE REDUCTION

(71) Applicant: Novatek Microelectronics Corp., Hsinchu (TW)

(72) Inventors: Chien-Chi Chen, Yunlin County (TW); Tung-Hsin Lee, Hsinchu (TW); Chieh-Cheng Chen, Changhua County (TW)

(73) Assignee: Novatek Microelectronics Corp., Hsinchu (TW)

( * ) Notice: Subject to any disclaimer, the term of this patent is extended or adjusted under 35 U.S.C. 154(b) by 170 days.

(21) Appl. No.: 14/981,821

(22) Filed: Dec. 28, 2015

(65) Prior Publication Data
US 2017/0188038 A1 Jun. 29, 2017

(51) Int. Cl.
*G06T 5/50* (2006.01)
*G06T 5/00* (2006.01)

(52) U.S. Cl.
CPC .......... *G06T 5/50* (2013.01); *G06T 5/002* (2013.01); *G06T 2207/20021* (2013.01); *G06T 2207/20182* (2013.01)

(58) Field of Classification Search
CPC .................. H04N 19/51; G06T 5/50
See application file for complete search history.

(56) References Cited

U.S. PATENT DOCUMENTS

| | | | | |
|---|---|---|---|---|
| 6,430,303 B1* | 8/2002 | Naoi | .............. | G06T 7/254 340/937 |
| 7,224,731 B2* | 5/2007 | Mehrotra | .............. | H04N 5/145 348/E5.066 |
| 7,616,692 B2* | 11/2009 | Holcomb | .............. | H04N 19/70 375/240.16 |
| 8,259,809 B2* | 9/2012 | Lin | .............. | H04N 19/14 375/240.17 |
| 8,705,626 B2* | 4/2014 | Hong | .............. | H04N 5/145 375/240.16 |
| 8,971,402 B2* | 3/2015 | Rodriguez | .............. | H04N 19/66 375/240.01 |
| 9,014,490 B2* | 4/2015 | Dong | .............. | G06T 5/002 382/225 |
| 9,025,822 B2* | 5/2015 | Jin | .............. | G06K 9/4642 348/154 |

(Continued)

*Primary Examiner* — Jayanti K Patel
*Assistant Examiner* — Irfan Habib
(74) *Attorney, Agent, or Firm* — JCIPRNET (57) ABSTRACT

An apparatus for motion compensated noise reduction for input images is provided. The motion estimation and motion compensation circuit performs a motion estimation operation and a motion compensation operation on a current image and a previous image to obtain a first patch. The block matching operation circuit performs a block matching operation on the current image and the previous image to obtain a second patch. The motion detection circuit performs a motion detection operation on a target patch according to the first patch and the second patch to output a set of third patches. The current image includes the target patch. The noise reduction circuit performs a noise reduction operation on the set of third patches according to a threshold curve, so as to generate the target patch that the noise is reduced. A method for motion compensated noise reduction for input images is also provided.

16 Claims, 5 Drawing Sheets

(56) References Cited

U.S. PATENT DOCUMENTS

| | | | |
|---|---|---|---|
| 9,031,345 B2* | 5/2015 | Jin | G06T 5/003 382/254 |
| 9,105,082 B2* | 8/2015 | Kim | G06T 5/002 |
| 9,165,373 B2* | 10/2015 | Jin | G06T 7/215 |
| 9,245,326 B2* | 1/2016 | Salvador | G06T 3/4053 |
| 9,330,442 B2* | 5/2016 | Kang | G06T 5/002 |
| 9,355,649 B2* | 5/2016 | King | G11B 27/10 |
| 9,432,596 B2* | 8/2016 | Sasaki | H04N 5/357 |
| 9,454,807 B2* | 9/2016 | Chen | G06T 5/002 |
| 9,471,964 B2* | 10/2016 | Ren | G06T 5/002 |
| 9,621,909 B2* | 4/2017 | Kim | H04N 19/463 |
| 9,654,792 B2* | 5/2017 | Chiu | H04N 19/56 |
| 9,749,650 B2* | 8/2017 | Panusopone | H04N 19/51 |
| 9,990,699 B1* | 6/2018 | Sadok | G06T 5/002 |
| 10,075,733 B2* | 9/2018 | Yamamoto | H04N 19/105 |
| 10,110,891 B2* | 10/2018 | Yamamoto | H04N 19/463 |
| 2006/0034530 A1* | 2/2006 | Park | G06T 9/004 382/236 |
| 2008/0043850 A1* | 2/2008 | Nair | H04N 5/145 375/240.16 |
| 2008/0239094 A1* | 10/2008 | Baqai | H04N 1/00 348/223.1 |
| 2010/0141804 A1* | 6/2010 | Morel | G06T 5/50 348/241 |
| 2011/0229029 A1* | 9/2011 | Kass | G06T 5/002 382/168 |
| 2012/0105728 A1* | 5/2012 | Liu | H04N 5/213 348/607 |
| 2012/0207396 A1* | 8/2012 | Dong | G06T 5/002 382/218 |
| 2012/0308104 A1* | 12/2012 | Yang | G06T 5/002 382/131 |
| 2014/0218571 A1* | 8/2014 | Cheng | G06T 5/002 348/273 |
| 2015/0187053 A1* | 7/2015 | Chen | G06T 5/002 382/264 |

* cited by examiner

METHOD AND APPARATUS FOR MOTION COMPENSATED NOISE REDUCTION

BACKGROUND OF THE INVENTION

1. Field of the Invention

The invention generally relates to a method and an apparatus for image processing, in particular, to a method and an apparatus for motion compensated noise reduction (MCNR).

2. Description of Related Art

Motion compensation is an algorithmic technique used to predict a frame in a video, given the previous and/or future frames by accounting for motion of the camera and/or objects in the video. Motion compensation describes a picture in terms of the transformation of a reference picture to the current picture. The reference picture may be previous in time or even from the future. The motion vectors describe the transformation from one frame to another frame. The motion vector relates to the whole frame (global motion estimation) or specific parts thereof, such as rectangular blocks, arbitrary shaped patches or even per pixel. Furthermore, applying the motion vectors to a frame to synthesize the transformation to another frame is called motion compensation. The combination of motion estimation and motion compensation is a commonly used technology in image processing. After motion compensation, noise reduction may be necessary for better image quality. A conventional MCNR, which is motion compensation noise reduction, highly depends on the accuracy of motion compensation results because the goal of MCNR is to obtain the perfect matching patch by true motion given from motion estimation.

In addition, a block matching algorithm involves dividing the current frame of a video into macroblocks and comparing each of the macroblocks with a corresponding block and its adjacent neighbors in a nearby frame of the video (sometimes just the previous one). A vector is created that models the movement of a macroblock from one location to another. This movement, calculated for all the macroblocks comprising a frame, constitutes the motion estimated in a frame. A conventional block matching algorithm is easily affected by the result of full search, and the block matching algorithm has no mechanism to select the perfect similar patch since the block matching algorithm cannot determine whether selected patches are perfect matching.

SUMMARY OF THE INVENTION

Accordingly, the invention is directed to a method and an apparatus for motion compensated noise reduction (MCNR), that provide a better performance of noise reduction.

The invention provides a method for motion compensated noise reduction for input images. The method includes: performing a motion estimation (ME) operation and a motion compensation (MC) operation on a current image and a previous image to obtain at least one first patch; performing a block matching operation on the current image and the previous image to obtain at least one second patch; performing a motion detection operation on a target patch according to the at least one first patch and the at least one second patch to output a set of third patches; and performing a noise reduction operation on the set of third patches according to a threshold curve, so as to generate the target patch that the noise is reduced. The current image includes the target patch.

In an exemplary embodiment of the invention, the step of performing the motion detection operation on the target patch according to the at least one first patch and the at least one second patch to output the set of third patches includes: performing a similarity calculation on the target patch and the at least one first patch to obtain a motion value; and performing a patch searching operation to determine a number of the at least one second patch that the set of third patches includes based on the motion value.

In an exemplary embodiment of the invention, the larger the motion value is, the more second patches are added into the set of third patches, and the smaller the motion value is, the less second patches are added into the set of third patches.

In an exemplary embodiment of the invention, the step of performing the noise reduction operation on the set of third patches according to the threshold curve includes: transforming the set of third patches in a spatial domain into the set of third patches in a frequency domain; filtering the noise of the set of third patches in the frequency domain according to the threshold curve; and transforming the set of third patches in the frequency domain into the set of third patches in the spatial domain.

In an exemplary embodiment of the invention, the step performing the noise reduction operation on the set of third patches according to the threshold curve further includes: determining a relationship of the threshold curve with respect to a threshold value and a frequency according to a preset value.

In an exemplary embodiment of the invention, the threshold curve is selected from one of an exponential curve, an oblique line and a straight line.

In an exemplary embodiment of the invention, the step of performing the noise reduction operation on the set of third patches according to the threshold curve further includes: performing a patch-wise estimation operation on the set of third patches to, so as to generate the target patch that the noise is reduced.

In an exemplary embodiment of the invention, the set of third patches includes the target patch and the at least one first patch.

In an exemplary embodiment of the invention, the set of third patches further includes the at least one second patch.

The invention provides an apparatus for motion compensated noise reduction for input images. The apparatus includes a motion estimation and motion compensation (MEMC) circuit, a block matching operation circuit, a motion detection circuit, and a noise reduction circuit. The motion estimation and motion compensation circuit is configured to perform a motion estimation operation and a motion compensation operation on a current image and a previous image to obtain at least one first patch. The block matching operation circuit is configured to perform a block matching operation on the current image and the previous image to obtain at least one second patch. The motion detection circuit is coupled to the motion estimation and motion compensation circuit and the block matching operation circuit. The motion detection circuit is configured to perform a motion detection operation on a target patch according to the at least one first patch and the at least one second patch to output a set of third patches. The current image includes the target patch. The noise reduction circuit is coupled to the motion detection circuit. The noise reduction circuit is configured to perform a noise reduction operation on the set of third patches according to a threshold curve, so as to generate the target patch that the noise is reduced.

In an exemplary embodiment of the invention, the motion detection circuit includes a similarity calculation circuit and a patch searching circuit. The similarity calculation circuit is coupled to the motion estimation and motion compensation circuit. The similarity calculation circuit is configured to perform a similarity calculation on the target patch and the at least one first patch to obtain a motion value. The patch searching circuit is coupled to the block matching operation circuit and the similarity calculation circuit. The patch searching circuit is configured to perform a patch searching operation to determine a number of the at least one second patch that the set of third patches includes based on the motion value.

In an exemplary embodiment of the invention, the larger the motion value is, the more second patches are added into the set of third patches, and the smaller the motion value is, the less second patches are added into the set of third patches.

In an exemplary embodiment of the invention, the noise reduction circuit includes a first transforming circuit, a noise filtering circuit, and a second transforming circuit. The first transforming circuit is coupled to the motion detection circuit. The first transforming circuit is configured to transform the set of third patches in a spatial domain into the set of third patches in a frequency domain. The noise filtering circuit is coupled to the first transforming circuit. The noise filtering circuit is configured to filter the noise of the set of third patches in the frequency domain according to the threshold curve. The second transforming circuit is coupled to the noise filtering circuit. The second transforming circuit is configured to transform the set of third patches in the frequency domain into the set of third patches in the spatial domain.

In an exemplary embodiment of the invention, the noise reduction circuit further includes a threshold determining circuit. The threshold determining circuit is coupled to the noise filtering circuit. The threshold determining circuit is configured to determine a relationship of the threshold curve with respect to a threshold value and a frequency according to a preset value.

In an exemplary embodiment of the invention, the threshold curve is selected from one of an exponential curve, an oblique line and a straight line.

In an exemplary embodiment of the invention, the noise reduction circuit further includes a patch-wise estimation circuit. The patch-wise estimation circuit is coupled to the second transforming circuit. The patch-wise estimation circuit is configured to perform a patch-wise estimation operation on the set of third patches, so as to generate the target patch that the noise is reduced.

In an exemplary embodiment of the invention, the set of third patches includes the target patch and the at least one first patch.

In an exemplary embodiment of the invention, the set of third patches further includes the at least one second patch.

According to the above descriptions, in the embodiments of the invention, the noise reduction operation is performed on the set of third patches according to the threshold curve, so as to generate the target patch that the noise is reduced, and a better performance of noise reduction is provided.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

The term "coupling/coupled" used in this specification (including claims) of the disclosure may refer to any direct or indirect connection means. For example, "a first device is coupled to a second device" should be interpreted as "the first device is directly connected to the second device" or "the first device is indirectly connected to the second device through other devices or connection means." In addition, the term "signal" can refer to a current, a voltage, a charge, a temperature, data, electromagnetic wave or any one or multiple signals.

Figure 1:
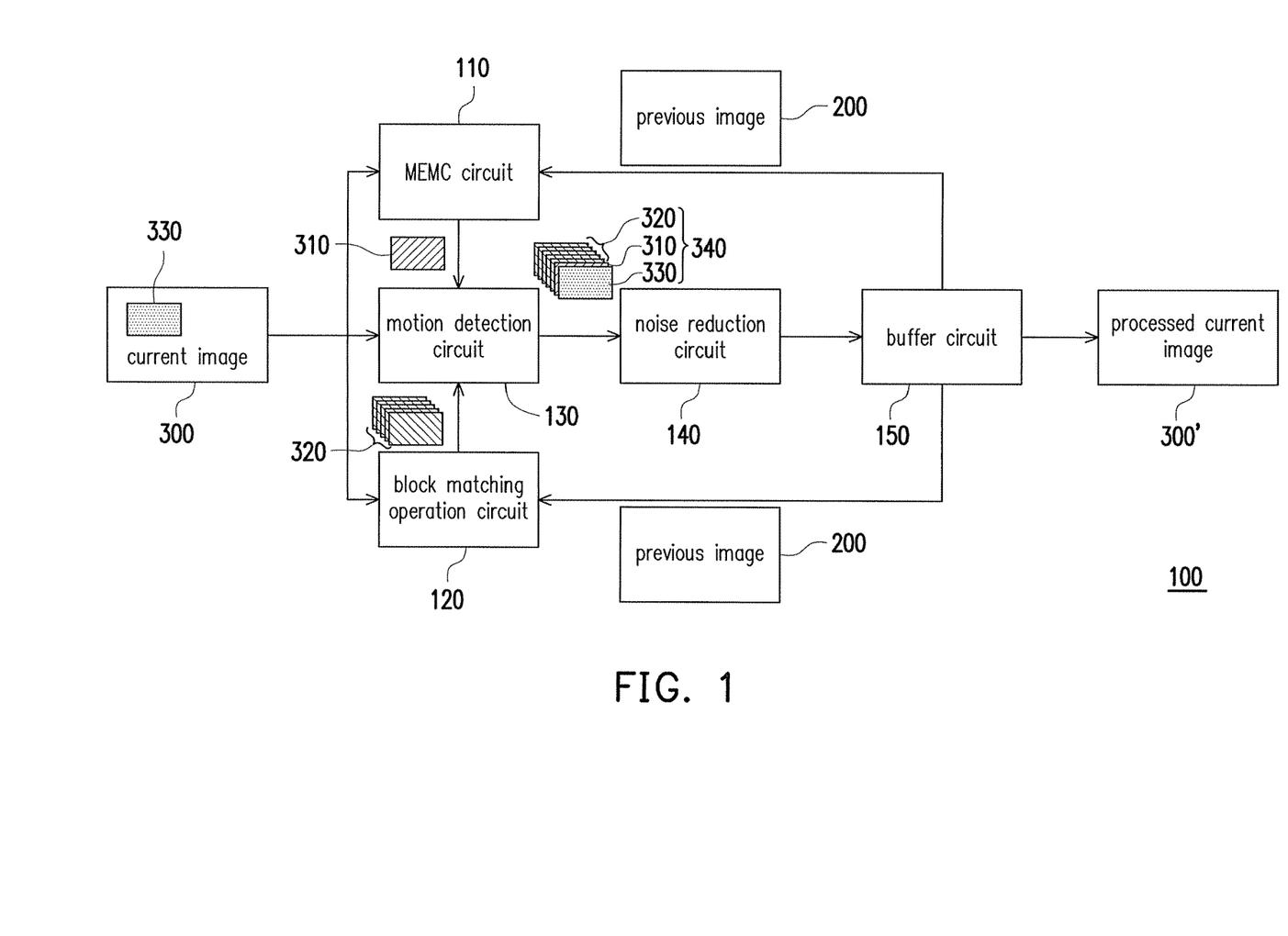
FIG. 1 is a schematic diagram illustrating an apparatus for motion compensated noise reduction according to one exemplary embodiment of the invention.

FIG. 1 is a schematic diagram illustrating an apparatus for motion compensated noise reduction according to one exemplary embodiment of the invention. Referring to FIG. 1, the apparatus 100 of the present embodiment receives input images, and performs a motion compensated noise reduction (MCNR) operation on the input images, so as to output output images to be displayed in a display apparatus (not shown). In the present embodiment, noises of the input images are removed as much as possible, and details thereof are preserved. When the MCNR operation is performed on a current image 300, a previous image 200 is taken into consideration in the present embodiment.

To be specific, the apparatus 100 includes a motion estimation and motion compensation (MEMC) circuit 110, a block matching operation circuit 120, a motion detection circuit 130, a noise reduction circuit 140, and a buffer circuit 150 in the present embodiment. The MEMC circuit 110 is configured to perform a motion estimation operation and a motion compensation operation on the current image 300 and the previous image 200 to obtain at least one first patch 310, e.g. a motion compensation (MC) patch. In the present embodiment, the motion estimation operation and the motion compensation operation are performed on the current image 300 and the previous image 200 to obtain a true motion. The true motion may be obtained by several algorithms, such as 3DRS (3-D Recursive Search), MVFAST (Motion Vector Field Adaptive Search Technique), PMVF- SDT (Predictive Motion Vector Field Adaptive Search Technique) and so on, but the invention is not limited thereto.

The block matching operation circuit 120 is configured to perform a block matching operation on the current image 300 and the previous image 200 to obtain at least one second patch 320, e.g. a plurality of full search (FS) patches. In the present embodiment, the block matching operation may include BM3D (Block Matching 3D) or 3D collaborative filtering. For the block matching operation, a full search may be necessary. There are various methods, such as three step search (TSS), new three step search (NTSS), diamond search and so on, which may be adopted to accelerate full searches. Compared to the conventional BM3D, the current image 300 and the previous image 200 may be simply taken into consideration in the block matching operation of the present embodiment. However, the invention is not limited thereto. In one exemplary embodiment, the image next to the current image 300 may also be considered for the block matching operation.

The motion detection circuit 130 is configured to perform a motion detection operation on a target patch 330 according to the first patch 310 and the second patches 320, and output a set of third patches 340 to the noise reduction circuit 140. The current image 300 includes the target patch 330. In the present embodiment, the motion detection operation is adopted to predict whether the first patch 310 from the MEMC circuit 110 is similar to the target patch 330. The method for predicting similarity may include the temporal difference, the temporal and spatial difference, the optical flow, the cross correlation, the structural similarity SSIM and so on, but the invention is not limited thereto. In the present embodiment, the optical flow may be adopted for the similarity prediction, and performed in a block-based manner. The conventional optical flow is performed in a pixel-based manner.

Figure 4A:
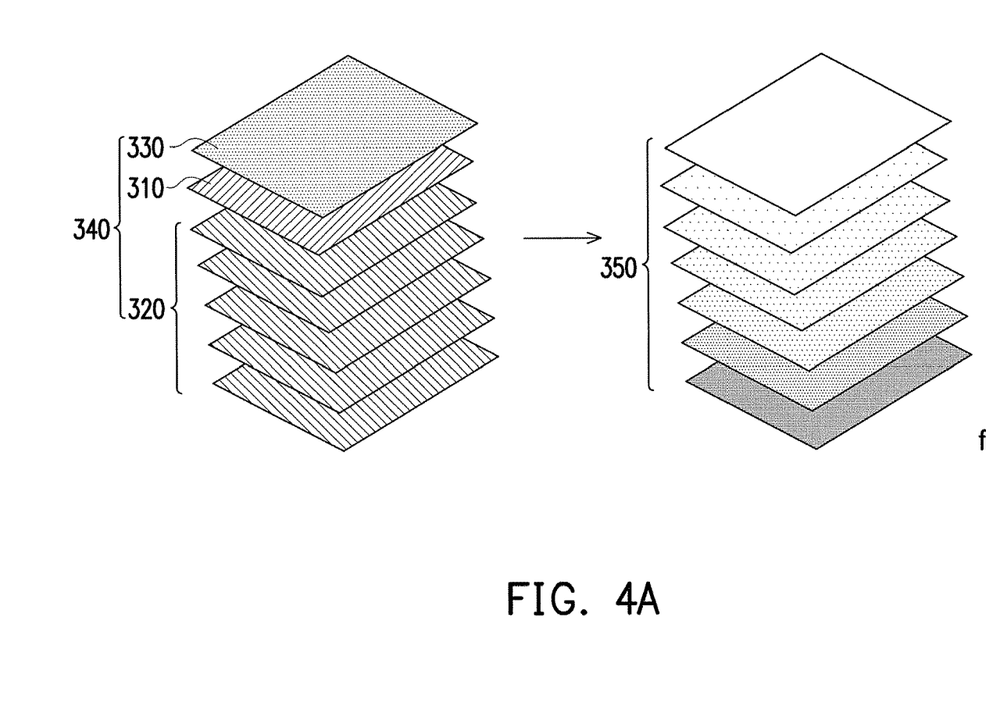
FIG. 4A is a schematic diagram illustrating patches in a spatial domain and in a frequency domain according to one exemplary embodiment.
Figure 4B:
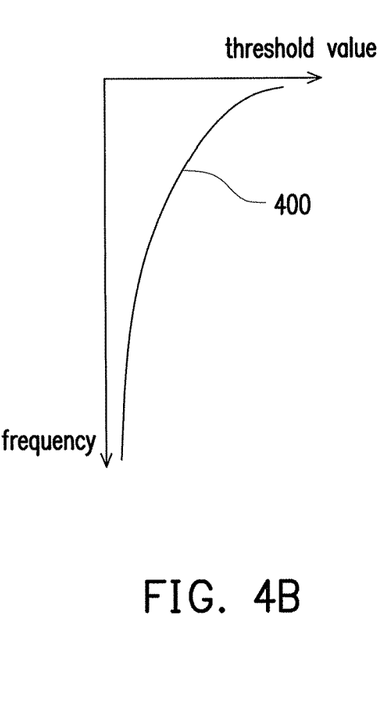
FIG. 4B illustrates a threshold curve for noise filtering according to one exemplary embodiment.

The noise reduction circuit 140 is configured to perform a noise reduction operation on the set of third patches 340 according to a threshold curve, so as to generate the target patch 340 that the noise is reduced. The threshold curve of the present embodiment is illustrated in FIG. 4B, for example, and the invention is not limited thereto. After the noise reduction operation, the current image 300 including the target patch 340 is outputted and stored in the buffer circuit 150. The buffer circuit 150 is configured to output the processed current image 300' to the display apparatus to be displayed, and further feed the previous image 200 back to the MEMC circuit 110 and the block matching operation circuit 120 for image processing.

In the present embodiment, the motion estimation operation, the motion compensation operation, the block matching operation, the motion detection operation, and the noise reduction operation may be respectively performed on the current image 300 or the previous image 200 in the block-based manner. Therefore, the patches described in the present embodiment may include one or more blocks of the current image 300 or the previous image 200. In addition, the number of the patches illustrated in FIG. 1 is disclosed for exemplary description, and the invention is not limited thereto. For example, in one exemplary embodiment, the MEMC circuit 110 may output two or more first patches 310 to the motion detection circuit 130 for the motion detection operation.

In the present embodiment, the MEMC circuit 110, the block matching operation circuit 120, the motion detection circuit 130, the noise reduction circuit 140, and the buffer circuit 150 may be implemented by using any adaptive hardware circuit structure in the related art, which are not particularly limited by the present disclosure. In one exemplary embodiment, these circuits may also be implemented in software or firmware. For software implementation, the apparatus 100 may include a processor to execute functional operations corresponding to the foregoing circuits. Enough teaching, suggestion, and implementation illustration for the foregoing image processing circuit may be obtained with reference to common knowledge in the related art, which is not repeated hereinafter.

Figure 2:
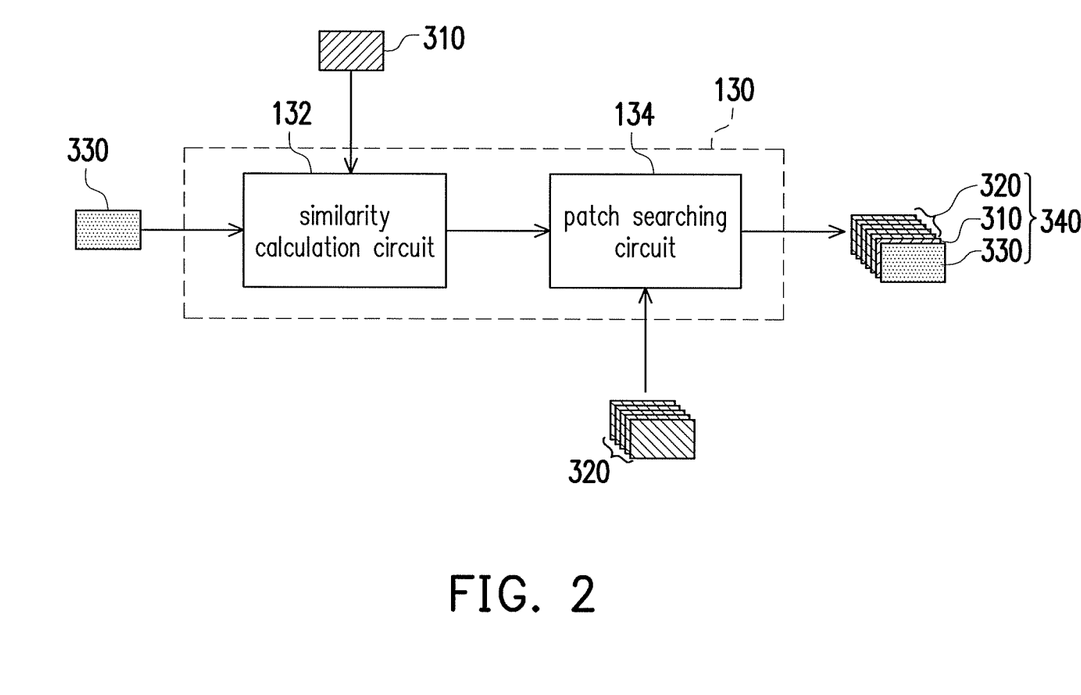
FIG. 2 is a schematic diagram illustrating the motion detection circuit according to one exemplary embodiment of the invention.

FIG. 2 is a schematic diagram illustrating the motion detection circuit according to one exemplary embodiment of the invention. Referring to FIG. 2, the motion detection operation includes two main steps in the present embodiment. One is the similarity calculation, and the other one is the patch searching operation. However, the invention is not limited thereto. In one exemplary embodiment, the motion detection operation may further include adaptive steps for image processing.

To be specific, the motion detection circuit 130 of the present embodiment includes a similarity calculation circuit 132 and a patch searching circuit 134. The similarity calculation circuit 132 is configured to perform the similarity calculation on the target patch 330 and the first patch 310 to obtain a motion value $\gamma$. The patch searching circuit 134 is configured to perform a patch searching operation to determine a number of the second patches 320 that the set of third patches 340 includes based on the motion value $\gamma$. The similarity between the target patch 330 and the first patch 310 is calculated to obtain the motion value $\gamma$ in the present embodiment. The motion value $\gamma$ is indicative of the similarity level. In the present embodiment, the similarity calculation may include the temporal difference, the temporal and spatial difference, the optical flow, the cross correlation, the structural similarity SSIM and so on, but the invention is not limited thereto. In the present embodiment, the optical flow may be used to find the true motion by the temporal and spatial difference between two patches, i.e. the target patch 330 and the first patch 310. Therefore, the motion value $\gamma$ of the true motion is gained based on the optical flow. Enough teaching, suggestion, and implementation illustration for details of the optical flow may be obtained with reference to common knowledge in the related art, which is not repeated hereinafter.

Once the motion value $\gamma$ is obtained, the next step is to determine the number of the second patches 320 that is added into the set of third patches 340. The number of the second patches 320 is determined depending on the motion value $\gamma$, so that different proportions that the second patches 320 occupies in the set of third patches 340 are given. In the present embodiment, the larger the motion value $\gamma$ is, the more second patches 320 are added into the set of third patches 340, and the smaller the motion value $\gamma$ is, the less second patches are added into the set of third patches. In one exemplary embodiment, the second patches 320 may be unnecessary for the noise reduction operation if the first patch 310 is similar to the target patch 330. That is to say, if the obtained motion value $\gamma$ is smaller than a predetermined value, no second patch is added into the set of third patches 340.

In the present embodiment, the similarity calculation circuit 132 and the patch searching circuit 134 may be implemented by using any adaptive circuit structure in the related art, which are not particularly limited by the present disclosure. Enough teaching, suggestion, and implementation illustration for the foregoing image processing circuit may be obtained with reference to common knowledge in the related art, which is not repeated hereinafter.

Figure 3:
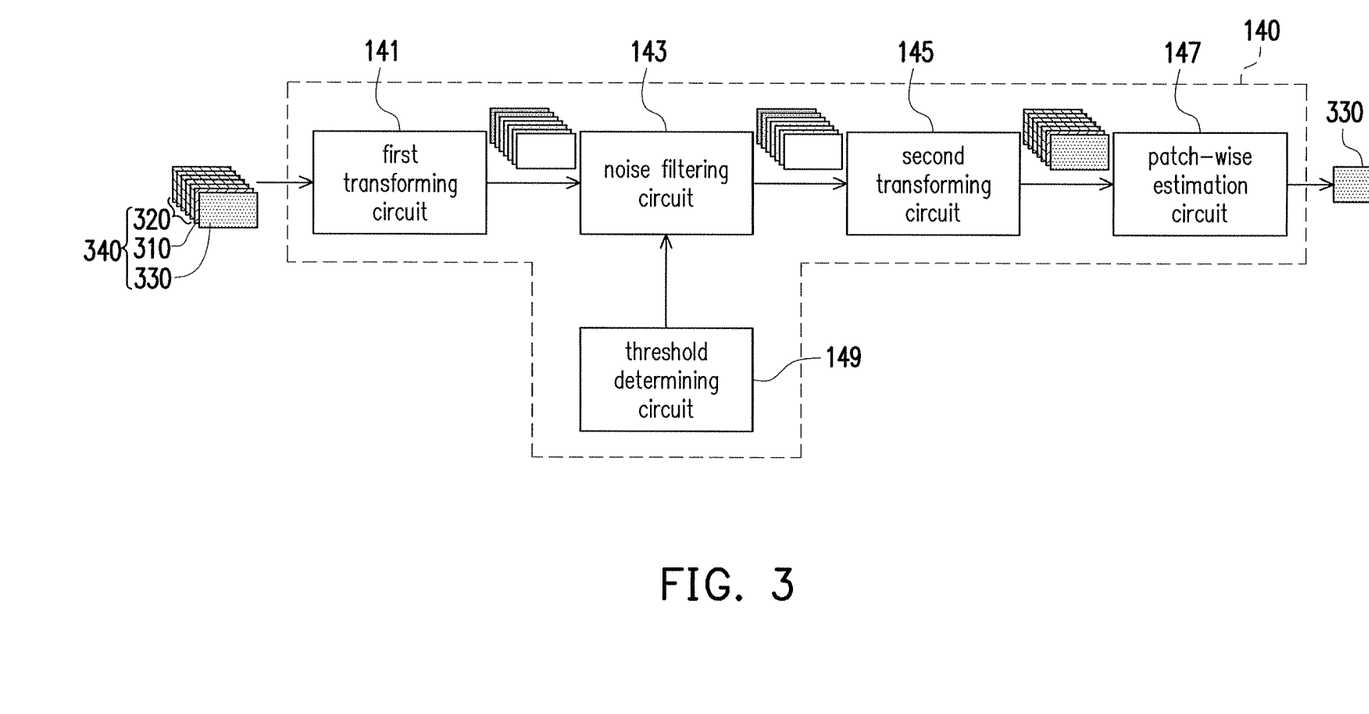
FIG. 3 is a schematic diagram illustrating the noise reduction circuit according to one exemplary embodiment of the invention.

FIG. 3 is a schematic diagram illustrating the noise reduction circuit according to one exemplary embodiment of the invention. FIG. 4A is a schematic diagram illustrating patches in a spatial domain and in a frequency domain according to one exemplary embodiment. FIG. 4B illustrates a threshold curve for noise filtering according to one exemplary embodiment.

Referring to FIG. 3 to FIG. 4B, the noise reduction operation of the present embodiment has four main steps as shown in FIG. 3. In the present embodiment, the noise reduction circuit 140 includes a first transforming circuit 141, a noise filtering circuit 143, a second transforming circuit 145, a patch-wise estimation circuit 147, and a threshold determining circuit 149. However, the invention is not limited thereto. In one exemplary embodiment, the noise filtering circuit 143 and the threshold determining circuit 149 may be integrated into a single circuit according to design requirement.

To be specific, the first transforming circuit 141 is configured to transform the set of third patches 340 in a spatial domain into the set of third patches 350 in a frequency domain as illustrated in FIG. 4A. In the present embodiment, the domain transformation operation may include the discrete cosine transform (DCT) and the Hadamard transform, but the invention is not limited thereto. The noise filtering circuit 143 is configured to filter the noises of the set of third patches 350 in the frequency domain according to the threshold curve 400 as shown in FIG. 4B. The threshold curve 400 shows a relationship with respect to the threshold value and the frequency. The threshold curve 400 is modified to set different threshold values for different frequencies. Accordingly, the noise reduction operation is flexibly adjusted. For example, users may feel uncomfortable for the large and high frequent noises, so the noise reduction operation is necessary to remove uncomfortable noises and leave the small and low frequent noises in the scene. Because getting rid of all noises means losing some details as well, it is not pleasant to see for users.

The second transforming circuit 145 is configured to transform the set of third patches 350 in the frequency domain that the noises are reduced into the set of third patches 340 in the spatial domain. In the present embodiment, the domain transformation operation of the second transforming circuit 145 may be an inverse transform of the domain transformation operation of the first transforming circuit 141, such as the inverse discrete cosine transform (DCT) and the inverse Hadamard transform, but the invention is not limited thereto. The patch-wise estimation circuit 147 is configured to perform a patch-wise estimation operation on the set of third patches 340, so as to generate the target patch 330 that the noises are reduced. In the present embodiment, the patch-wise estimation operation may include block-wise estimation operation for repositioning the target patch 330 in the current image 300 and reconstructing the target patch 330.

The threshold determining circuit 149 is configured to determine the relationship of the threshold curve 400 with respect to the threshold value and the frequency according to a preset value. In the present embodiment, the preset value is a setting parameter that inputs to the threshold determining circuit 149. The setting parameter may be set by designers according to actual requirements. In the present embodiment, an exponential curve is applied for the threshold values in the noise filtering circuit 143. As illustrated in FIG. 4B, the lower the frequency is, the larger the threshold value is, and the higher the frequency is, the smaller the threshold value is. The adjustable threshold values are helpful to leave low noises to increase sharpness of details instead of annoying users. In the present embodiment, the exponential curve is disclosed for exemplarily describing the threshold curve 400, but the invention is not limited thereto. In one exemplary embodiment, the threshold curve 400 may be an oblique line or a straight line.

In the present embodiment, the first transforming circuit 141, the noise filtering circuit 143, the second transforming circuit 145, the patch-wise estimation circuit 147, and the threshold determining circuit 149 may be implemented by using any adaptive circuit structure in the related art, which are not particularly limited by the present disclosure. Enough teaching, suggestion, and implementation illustration for the foregoing image processing circuit may be obtained with reference to common knowledge in the related art, which is not repeated hereinafter.

Figure 5:
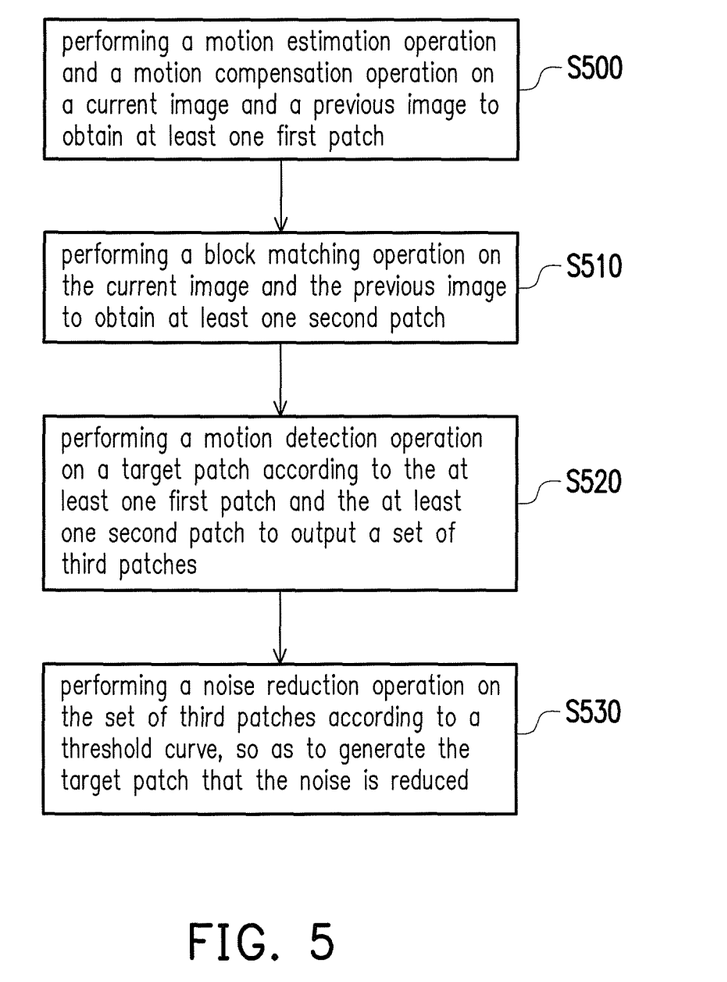
FIG. 5 is a flowchart illustrating steps in the method for motion compensated noise reduction according to one embodiment of the invention.

FIG. 5 is a flowchart illustrating steps in the method for motion compensated noise reduction according to one embodiment of the invention. Referring to FIG. 1 and FIG. 5, the method for motion compensated noise reduction of the present embodiment is at least adapted to the apparatus 100 of FIG. 1, but the invention is not limited thereto. Taking the apparatus 100 of FIG. 1 for example, in step S500, The MEMC circuit 110 performs the motion estimation operation and the motion compensation operation on the current image 300 and the previous image 200 to obtain at least one first patch 310. In step S510, the block matching operation circuit 120 performs the block matching operation on the current image 300 and the previous image 200 to obtain at least one second patch 320. In step S520, the motion detection circuit 130 performs the motion detection operation on the target patch 330 according to the at least one first patch 310 and the at least one second patch 320 to output the set of third patches 340. In step S530, the noise reduction circuit 140 performs the noise reduction operation on the set of third patches 340 according to the threshold curve, so as to generate the target patch 330 that the noise is reduced. In addition, the method for motion compensated noise reduction described in the present embodiment of the invention is sufficiently taught, suggested, and embodied in the embodiments illustrated in FIG. 1 to FIG. 4B, and therefore no further description is provided herein.

In the present embodiment, the motion estimation operation, the motion compensation operation, the block matching operation, the motion detection operation, and the noise reduction operation may be implemented by using any adaptive algorithms in the related art, which are not particularly limited by the present disclosure. Enough teaching, suggestion, and implementation illustration for the foregoing image processing operations may be obtained with reference to common knowledge in the related art, which is not repeated hereinafter.

In summary, in the exemplary embodiments of the invention, the method combining the MEMC operation and the block matching operation for noise reduction is proposed. Combining the MEMC operation and the block matching operation is to avoid adopting bias patches given by the MEMC operation. A robust mechanism is provided to adjust the proportion that the second patches occupy in the set of third patches. Moreover, the different threshold values are used for noise reduction in different frequencies to make noises being seen comfortable. Therefore, the noise reduction operation is performed on the set of third patches according to the threshold curve, so as to generate the target patch that the noise is reduced, and a better performance of noise reduction is provided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for motion compensated noise reduction for input images, comprising:
   performing a motion estimation operation and a motion compensation operation on a current image and a previous image to obtain at least one first patch comprising at least one first block;
   performing a block matching operation on the current image and the previous image to obtain at least one second patch comprising at least one second block;
   performing a motion detection operation on a target patch according to the at least one first patch and the at least one second patch to output a set of third patches, wherein the current image comprises the target patch, comprising:
   performing a similarity calculation on the target patch and the at least one first patch to obtain a motion value; and
   performing a patch searching operation to determine a number of the at least one second patch that the set of third patches comprises based on the motion value; and
   performing a noise reduction operation on the set of third patches in a frequency domain according to a threshold curve, so as to generate the target patch that the noise is reduced.

2. The method for motion compensated noise reduction according to claim 1, wherein the larger the motion value is, the more second patches are added into the set of third patches, and the smaller the motion value is, the less second patches are added into the set of third patches.

3. The method for motion compensated noise reduction according to claim 1, wherein the step of performing the noise reduction operation on the set of third patches according to the threshold curve comprises:
   transforming the set of third patches in a spatial domain into the set of third patches in the frequency domain;
   filtering the noise of the set of third patches in the frequency domain according to the threshold curve; and
   transforming the set of third patches in the frequency domain into the set of third patches in the spatial domain.

4. The method for motion compensated noise reduction according to claim 3, wherein the step performing the noise reduction operation on the set of third patches according to the threshold curve further comprises:
   determining a relationship of the threshold curve with respect to a threshold value and a frequency according to a preset value.

5. The method for motion compensated noise reduction according to claim 4, wherein the threshold curve is selected from one of an exponential curve, an oblique line and a straight line.

6. The method for motion compensated noise reduction according to claim 3, wherein the step of performing the noise reduction operation on the set of third patches according to the threshold curve further comprises:
   performing a patch-wise estimation operation on the set of third patches to, so as to generate the target patch that the noise is reduced.

7. The method for motion compensated noise reduction according to claim 1, wherein the set of third patches comprises the target patch and the at least one first patch.

8. The method for motion compensated noise reduction according to claim 7, wherein the set of third patches further comprises the at least one second patch.

9. An apparatus for motion compensated noise reduction for input images, comprising:
   a motion estimation and motion compensation circuit, configured to perform a motion estimation operation and a motion compensation operation on a current image and a previous image to obtain at least one first patch comprising at least one first block;
   a block matching operation circuit, configured to perform a block matching operation on the current image and the previous image to obtain at least one second patch comprising at least one second block;
   a motion detection circuit, coupled to the motion estimation and motion compensation circuit and the block matching operation circuit, and configured to perform a motion detection operation on a target patch according to the at least one first patch and the at least one second patch to output a set of third patches, wherein the current image comprises the target patch, wherein the motion detection circuit comprises:
   a similarity calculation circuit, coupled to the motion estimation and motion compensation circuit, and configured to perform a similarity calculation on the target patch and the at least one first patch to obtain a motion value; and
   a patch searching circuit, coupled to the block matching operation circuit and the similarity calculation circuit, and configured to perform a patch searching operation to determine a number of the at least one second patch that the set of third patches comprises based on the motion value; and
   a noise reduction circuit, coupled to the motion detection circuit, and configured to perform a noise reduction operation on the set of third patches in a frequency domain according to a threshold curve, so as to generate the target patch that the noise is reduced.

10. The apparatus for motion compensated noise reduction according to claim 9, wherein the larger the motion value is, the more second patches are added into the set of third patches, and the smaller the motion value is, the less second patches are added into the set of third patches.

11. The apparatus for motion compensated noise reduction according to claim 9, wherein the noise reduction circuit comprises:
    a first transforming circuit, coupled to the motion detection circuit, and configured to transform the set of third patches in a spatial domain into the set of third patches in the frequency domain;
    a noise filtering circuit, coupled to the first transforming circuit, and configured to filter the noise of the set of third patches in the frequency domain according to the threshold curve; and
    a second transforming circuit, coupled to the noise filtering circuit, and configured to transform the set of third patches in the frequency domain into the set of third patches in the spatial domain.

12. The apparatus for motion compensated noise reduction according to claim 11, wherein the noise reduction circuit further comprises:
    a threshold determining circuit, coupled to the noise filtering circuit, and configured to determine a relationship of the threshold curve with respect to a threshold value and a frequency according to a preset value.

13. The apparatus for motion compensated noise reduction according to claim 12, wherein the threshold curve is selected from one of an exponential curve, an oblique line and a straight line.

14. The apparatus for motion compensated noise reduction according to claim 11, wherein the noise reduction circuit further comprises:

a patch-wise estimation circuit, coupled to the second transforming circuit, and configured to perform a patch-wise estimation operation on the set of third patches, so as to generate the target patch that the noise is reduced.

15. The apparatus for motion compensated noise reduction according to claim 9, wherein the set of third patches comprises the target patch and the at least one first patch.

16. The apparatus for motion compensated noise reduction according to claim 15, wherein the set of third patches further comprises the at least one second patch.

* * * * *